United States Patent
Kim et al.

(10) Patent No.: US 9,764,600 B2
(45) Date of Patent: Sep. 19, 2017

(54) PNEUMATIC TIRE FOR VEHICLE

(71) Applicant: HANKOOK TIRE CO., LTD., Seoul (KR)

(72) Inventors: Jin Seop Kim, Daejeon (KR); Sang Tak Joo, Daejeong (KR); Sung Hee Youn, Seoul (KR); Su Jin Son, Seoul (KR); Myoung Joong Lee, Seoul (KR); Sang Moo Lee, Daejeon (KR); Mu Yeong Kim, Daejeon (KR)

(73) Assignee: HANKOOK TIRE CO., LTD., Seoul (KR)

(*) Notice: Subject to any disclaimer, the term of this patent is extended or adjusted under 35 U.S.C. 154(b) by 283 days.

(21) Appl. No.: 14/595,817

(22) Filed: Jan. 13, 2015

(65) Prior Publication Data
US 2015/0321520 A1    Nov. 12, 2015

(30) Foreign Application Priority Data
May 7, 2014    (KR) .................. 10-2014-0054074

(51) Int. Cl.
*B60C 11/12*    (2006.01)
*B60C 11/11*    (2006.01)

(52) U.S. Cl.
CPC .......... *B60C 11/11* (2013.01); *B60C 11/1218* (2013.04); *B60C 2011/1213* (2013.04)

(58) Field of Classification Search
CPC ............. B60C 11/12; B60C 11/1204; B60C 2011/1213; B60C 11/1218; B60C 11/1222; B60C 11/124; B60C 11/1281; B60C 11/11

USPC ............ 152/209.18, 209.19, 209.21, 209.22, 152/209.25

See application file for complete search history.

(56) References Cited

U.S. PATENT DOCUMENTS

| | | | | |
|---|---|---|---|---|
| 2010/0206447 A1* | 8/2010 | Ohashi | ............ | B60C 11/12 152/209.25 |
| 2011/0277896 A1* | 11/2011 | Nagayasu | .......... | B60C 11/1218 152/209.18 |

FOREIGN PATENT DOCUMENTS

| | | | |
|---|---|---|---|
| EP | 0543267 | | 5/1993 |
| EP | 1073562 | | 1/2003 |
| JP | 10-80923 | * | 3/1998 |
| JP | 2001-1722 | * | 1/2001 |
| JP | 2005-170308 | | 6/2005 |

(Continued)

*Primary Examiner* — Eric Hug
(74) *Attorney, Agent, or Firm* — Hamre, Schumann, Mueller & Larson, P.C.

(57) ABSTRACT

A pneumatic tire for a vehicle is herein disclosed. The pneumatic tire includes a tread, side walls, and beads. A plurality of tread blocks and grooves are formed in the tread. Kerfs are formed in the tread blocks. Each kerf face of each of the kerfs includes a flange portion, a plurality of concave kerf portions, and a plurality of convex kerf portions. The flange portion is formed in the outermost portion of the tread. The concave kerf and convex kerf portions are connected to the flange portion, and are alternately formed in depth and lengthwise directions of the kerf. The concave kerf portions correspond to opposite convex kerf portions. The convex kerf portions correspond to opposite concave kerf portions. The concave and convex kerf portions are configured such that the protrusion directions of the concave and convex kerf portions are opposite to each other.

10 Claims, 6 Drawing Sheets

(56) References Cited

FOREIGN PATENT DOCUMENTS

WO     WO 99/48707    *   9/1999

* cited by examiner

PNEUMATIC TIRE FOR VEHICLE

BACKGROUND

1. Technical Field

The present disclosure relates generally to a pneumatic tire for a vehicle and, more particularly, to a pneumatic tire for a vehicle that is capable of ensuring the uniform traction and stiffness of tread blocks through the application of three-dimensional (3D) kerfs for the optimization of stiffness to the tread blocks, thereby achieving excellent running performance on snowy, dry and wet roads.

2. Description of the Related Art

So far, various proposals have been made regarding pneumatic tires capable of improving running performance on a snowy road by enhancing the edge effect of the tires have been made. For example, a pneumatic tire in which kerfs are formed in a plurality of tread blocks extending in the circumferential and widthwise directions of the tire has been proposed.

However, in the conventional pneumatic tire, the kerfs are formed in the tread blocks and thus the tread blocks are separated by the kerfs, and thus the stiffness of the tread blocks is reduced, thereby causing the tread blocks to be easily deformed. Accordingly, a problem arises in that the kerfs collapse due to the deformation of the small blocks of the tread blocks separated by the kerfs during the rolling of the tire, the frictional force between the tire and a road is reduced, and then the leading portion of the tire is pushed into the inside of the tire, thereby reducing the running performance of a tire, particularly the control stability and acceleration and braking performance of the tire.

In order to improve such kerfs, a tire, including so-called three-dimensional (3D) kerfs formed by changing not only the shape thereof in a horizontal direction but also the shape thereof in a vertical direction into curved shapes, has been proposed. As conventional 3D kerf technologies, a technology for kerfs having two-pronged blades known as Y-shaped blades (see EP Patent publication No. EP0543267 B1), a technology for kerfs having blades configured such that various types of protrusions are formed on the sides of the blades (see EP Patent Publication No. EP1073562 B1), and a technology for kerfs having blades whose vertical sections are shaped in the form of straight lines and waveforms (see Japanese Patent Publication No. 2005-170308) have disclosed.

However, the problem of a reduction in the stiffness of tread blocks attributable to kerfs still needs to be overcome. Furthermore, in the case of stepped kerfs, a problem arises in that the blocks of stepped portions become thin and thus hang in tatters, thereby damaging the quality of the appearance of a tire.

SUMMARY

At least one embodiment of the present invention is directed to the provision of a pneumatic tire for a vehicle, which is capable of ensuring the uniform traction and stiffness of tread blocks because it is possible to ensure the even wear of kerfs while providing sufficient edge effect of the kerfs during the running of the tire on a snowy road, thereby improving running performance on a snowy road, particularly control stability and acceleration and braking performance.

At least one embodiment of the present invention is directed to the provision of a pneumatic tire for a vehicle, which is capable of improving both running performance on snowy and icy roads and running performance on a dry road because the stiffness of tread blocks is improved through the interlocking of the concave and convex kerf portions of kerfs, ensuring traction on a snowy road even when a tire has worn out because regular worn-out shapes are maintained at the end of the wear of the tire, and preventing the appearance of the tire from being damaged even when the tire has worn out because the kerfs are shaped in the form of continuous curves without steps.

In accordance with an aspect of the present invention, there is provided a pneumatic tire for a vehicle, including a tread, side walls, and beads; wherein a plurality of tread blocks and grooves are formed in the tread, and kerfs are formed in the tread blocks; wherein each kerf face of the kerf includes a flange portion formed in an outermost portion of the tread that is in contact with a ground; and a plurality of concave kerf portions and convex kerf portions connected to the flange portion and alternately formed in the depth and lengthwise directions of the kerf; and wherein concave kerf portions of one kerf face of the kerf are configured to be matched with opposite convex kerf portions of an opposite kerf face of the kerf, convex kerf portions of the one kerf face are configured to be matched with opposite concave kerf portions of the opposite kerf face, and the concave and convex kerf portions that alternate in the lengthwise direction are configured such that protrusion directions of the concave and convex kerf portions are opposite to each other.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described below with reference to the accompanying drawings. In these drawings, the same or similar reference symbols are assigned to the same or similar components.

"Kerf" refers to small grooves formed into tread blocks of a tire that subdivide the tread blocks and improve traction characteristics.

A pneumatic tire according to an exemplary embodiment of the present invention includes a tread, side walls, and beads. A plurality of tread blocks and grooves are formed in the tread.

Figure 1:
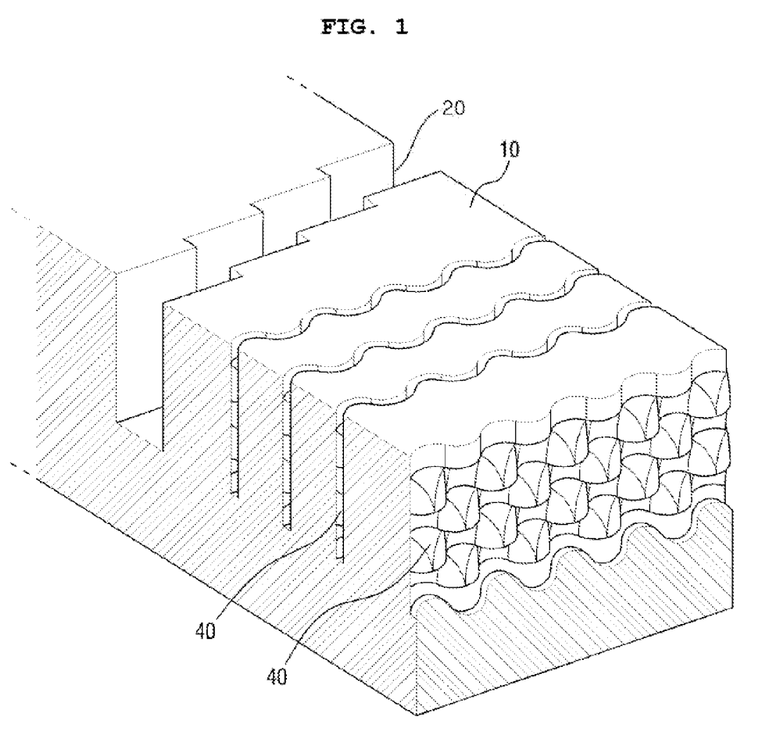
FIG. 1 is a perspective view illustrating the tread blocks and kerfs of a pneumatic tire according to an exemplary embodiment of the present invention.
Figure 2:
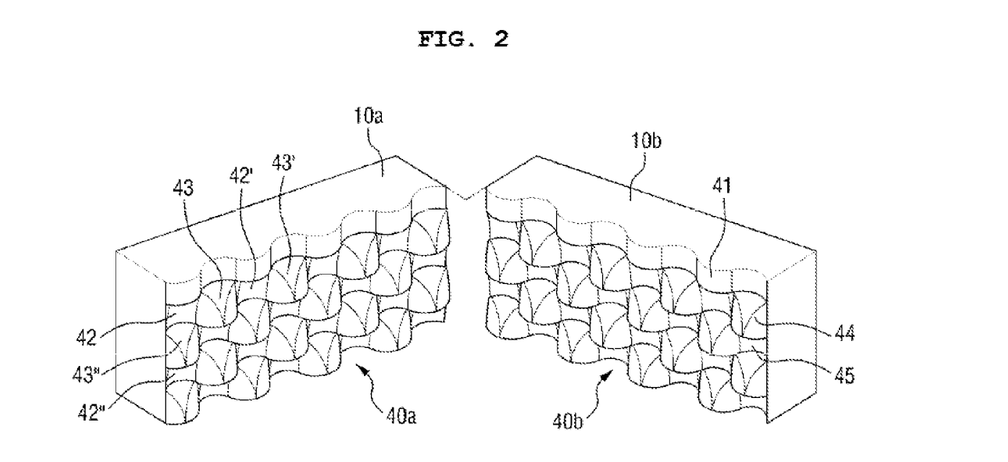
FIG. 2 is a schematic perspective view of a tread showing the opposing kerf faces of a kerf of a pneumatic tire according to an exemplary embodiment of the present invention.

FIG. 1 is a perspective view illustrating the tread blocks 10 and kerfs 40 of the pneumatic tire according to this embodiment of the present invention. FIG. 2 is a schematic perspective view of a tread blocks 10a, 10b showing the opposing kerf faces 40a, 40b of a kerf 40 of a pneumatic tire according to an exemplary embodiment of the present invention.

Referring to FIGS. 1 and 2, the tread blocks 10 that are defined by a plurality of grooves 20 extending in the circumferential and widthwise directions of the tire are arranged in the tread. More specifically, the kerfs 40 that are narrower than the grooves 20 are formed in the tread blocks 10 that are defined by a plurality of longitudinal grooves 20 extending in the circumferential direction of the tire and a plurality of transverse grooves extending in the widthwise direction of the tread.

The kerf has a first kerf face 40a, and an opposing kerf face 40b. One kerf face 10a of each of the kerfs 40 of a tire according to an exemplary embodiment of the present invention includes a flange portion 41 formed in the outermost portion of the tread that is in contact with the ground, and a plurality of concave kerf portions 42 and convex kerf portions 43 connected to the flange portion 41 and alternately formed in the depth and lengthwise directions of the kerf 40. The flange portion 41 is formed in a zigzag shape or a gentle waveform in the widthwise direction of the tread of the tire. The concave kerf portions 42 of the one kerf face 10a of the kerf 40 are configured to be matched with the opposite convex kerf portions 44 of the opposite kerf face 10b of the kerf 40. The convex kerf portions 43 of the one kerf face 10a are configured to be matched with the opposite concave kerf portions 45 of the opposite kerf face 10b. The kerf portions that alternate in the lengthwise direction are configured such that the protrusion directions thereof are opposite to each other. As described above, the concave kerf portions 42 of the one kerf face 10a protrude in a direction opposite to the protruding direction of the convex kerf portions 43 when viewed in a plan view, and are interlocked with and constrained by the convex kerf portions 44 of the opposite kerf face 10b. Meanwhile, the convex kerf portions 43 of the one kerf face 10a protrude in a direction opposite to the protruding direction of the concave kerf portions 42 when viewed in a plan view, and are interlocked with and constrained by the concave kerf portions 45 of the opposite kerf face 10b.

Referring to FIG. 2, a concave kerf portion 42 and a convex kerf portion 43 are alternately formed in the depth direction of a kerf 40. A concave kerf portion 42' and a convex kerf portion 43' are sequentially formed in the lengthwise direction of the kerf 40 on a side of the convex kerf portion 43. The convex kerf portion 43" is formed under the concave kerf portion 42 in the depth direction of the kerf 40. The concave kerf portion 42" is formed under the convex kerf portion 43". The kerfs according to this embodiment of the present invention have orientations at the same locations, but may maintain uniform block stiffness regardless of the direction of the behavior of the tire due to their shape in which two types of shapes alternate with each other.

Figure 3A:
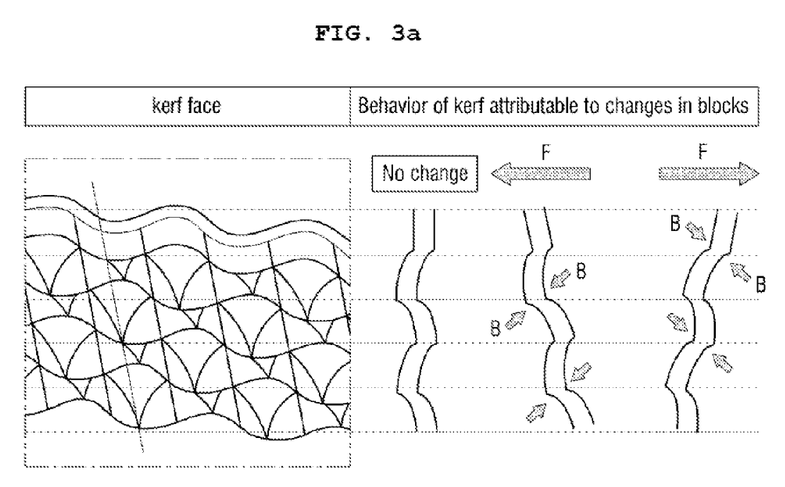
FIGS. 3a and 3b are schematic views illustrating the action of a kerf of a pneumatic tire according to an exemplary embodiment of the present invention and the behavior of the pneumatic tire.
Figure 3B:
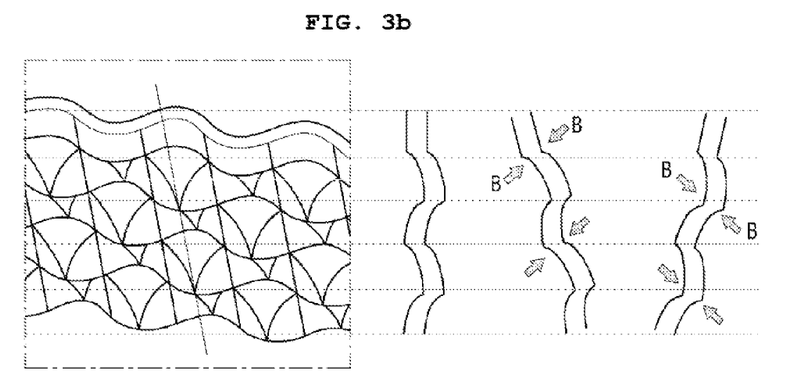
Figure 4:
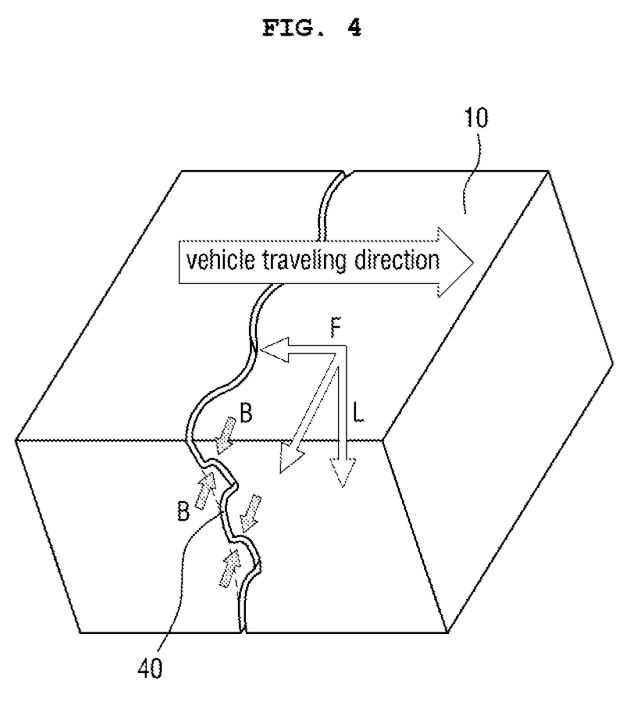
FIG. 4 is a schematic view illustrating the relationship of action between forces applied to tread blocks and a kerf in a pneumatic tire according to an exemplary embodiment of the present invention.
Figure 5A:
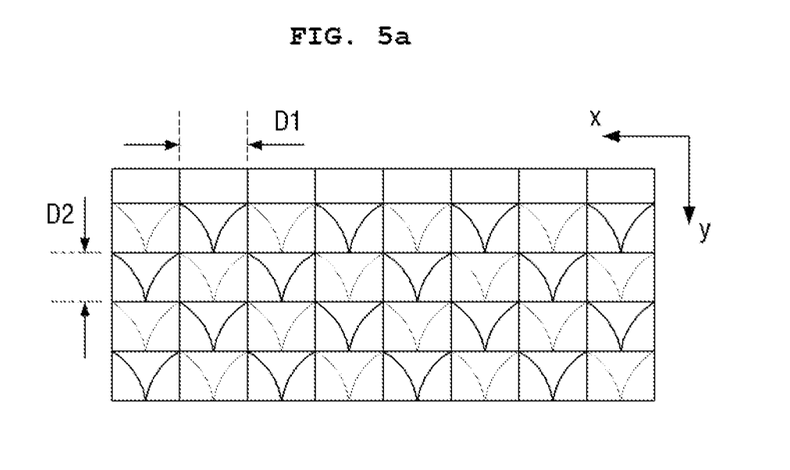
FIGS. 5a-5e show front, plan, longitudinal section and perspective views of a kerf illustrating the specification of the kerf of a pneumatic tire according to an exemplary embodiment of the present invention.
Figure 5B:
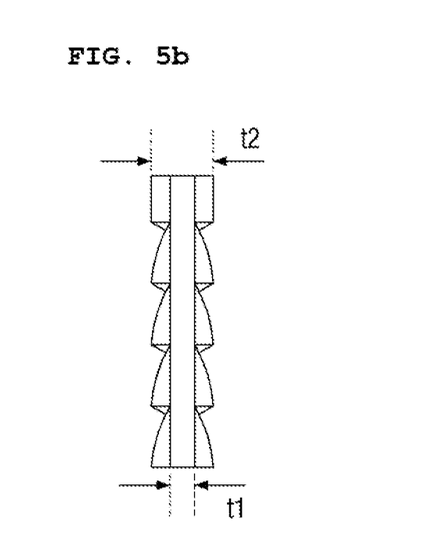
Figure 5C:
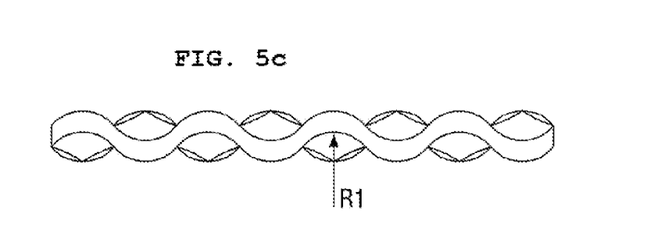
Figure 5D:
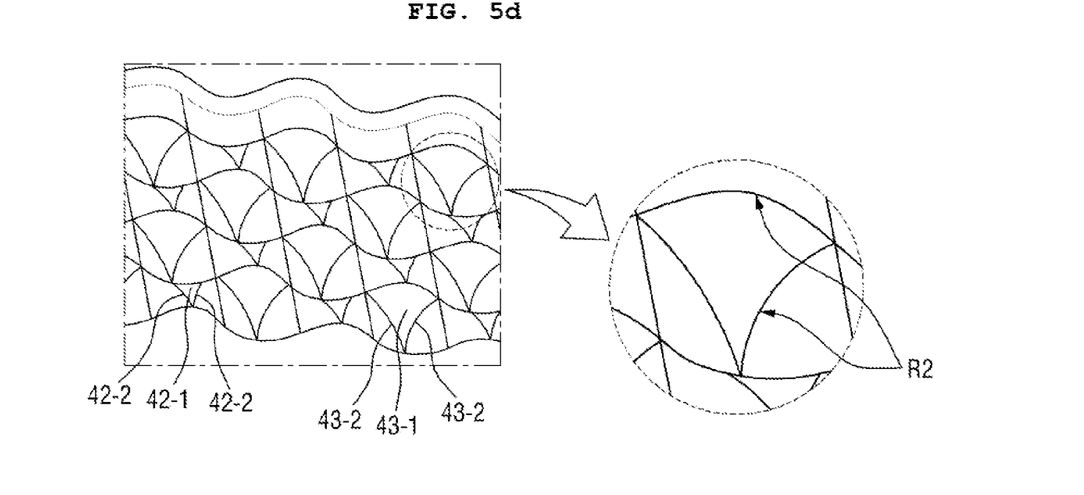
Figure 5E:
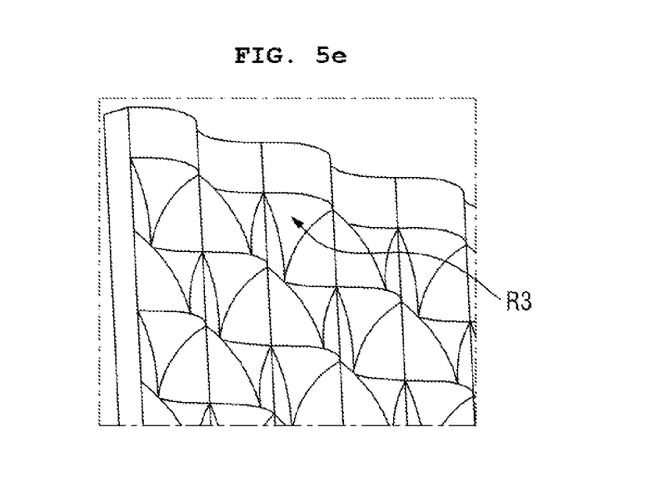

Referring to FIGS. 3a, 3b and 4, although interlocking having orientations is generated based on the behavior of the tread blocks of the tire, the orientations are different depending on the positions of the kerfs, and thus the interlocking is maximized. The greatest reaction force B is generated on a section perpendicular to a surface to which the resultant force of a shear force F and a load L is applied, and the highest interlocking effect is obtained at a location where reaction force is greatest. As described above, improved kerfs of the tire according to an exemplary embodiment of the present invention are designed to enhance the stiffness of the tread blocks through the interlocking of the concave and convex kerf portions of the kerf, and thus can improve running performance on dry and wet roads. Furthermore, regularly changing shapes can be maintained at the end of wear (for example, in a stage at which the tire wears to an extent of 70% or more), and thus uniform traction can be ensured on a snowy road even when the tire has worn down.

Referring to FIGS. 5a-5e, the thickness t1 of the straight section of a kerf 40 may range from 0.1 to 5.0 mm, the thickness t2 of an expanded section including a convex portion attributable to concave and convex kerf portions of the kerf 40 may range from 1.1 to 15 mm. The thickness t2 of the expanded section including the convex portion of the kerf 40 may be 1.1 to 3 times the thickness of the straight section.

Each of the length (D2) and width (D1) of the concave and convex kerf portion 42 and 43 of the kerf 40 according to an exemplary embodiment of the present invention ranges from 1 to 15 mm.

Referring to FIGS. 5a-5e, the concave kerf portion 42 includes a center portion 42-1 disposed on the center part of the concave kerf portion 42 and configured to extend downwardly from the upper end of the concave kerf portion 42 and form a cone or funnel shape, and side portions 42-2 disposed in contact with both sides of the center portion 42-1 and configured to form fan shapes. The convex kerf portion 43 includes a center portion 43-1 disposed on the center part of the convex kerf portion 43 and configured to form a cone, ginkgo leaf or funnel shape, and side portions 43-2 disposed in contact with both sides of the center portion 43-1 and configured to form fan shapes. As described above, the center portion 42-1 of the concave kerf portions 42 is formed in a concave funnel shape having a predetermined depth, and the side portions 42-2 are formed by tapered surfaces that are in contact with the side portions 43-2 of neighboring convex kerf portions 43. In this case, the side portions 42-2 in contact with both sides of the center portion 42-1 may have the same radius of curvature or different radii of curvature.

The radius of curvature R1 of the flange portion 41 of the kerf 40 may range from 0.5 to 100 mm. The radius of curvature R2 of the side portions 42-2 and 43-2 of the kerf 40 may range from 0.5 to 100 mm. The radius of curvature R3 of a boundary connecting the upper and surfaces of the kerf 40 may range from 0.5 to 100 mm. Meanwhile, the depth of the kerfs 40 may be formed to be 50 to 90% of the depth of the grooves 20.

In accordance with an exemplary embodiment of the present invention, both running performance on snowy and icy roads and running performance on dry and wet roads can be met because tread blocks on both sides of the kerf are interlocked with and constrained by each other along the 3D surfaces of the kerfs even when the kerfs are formed in the outermost portion of a tread in order to improve running performance on a snowy road. In addition, excellent running performance on a snowy road can be expected at the end of the wear of the tire because the stiffness of tread blocks increasing after the middle stage of wear is maintained at a value close to an initial design value.

In accordance with an exemplary embodiment of the present invention, kerfs are shaped in the form of continuous curves without steps, thereby advantageously maintaining the quality of the appearance of a tire even when the tire has worn out.

Although the prevent invention has been described with reference to specific embodiments of the present invention, those skilled in the art will appreciate that various modifications, additions and substitutions are possible without departing from the scope and spirit of the invention as disclosed in the accompanying claims. Therefore, the range of protection of the present invention should be interpreted only based on the following claims and equivalents thereto.

What is claimed is:

1. A pneumatic tire for a vehicle, comprising:
   a tread, side walls, and beads;
   wherein a plurality of tread blocks and grooves are formed in the tread, and a plurality of kerfs are formed in the tread blocks;
   wherein the plurality of kerfs include a plurality of kerf faces, each kerf face of each of the plurality of kerfs comprises:
      a flange portion formed in an outermost portion of the tread that is in contact with a ground, and
      a plurality of concave kerf portions and convex kerf portions connected to the flange portion and alternately formed in depth and lengthwise directions of the kerf;
   wherein concave kerf portions of one kerf face of each of the plurality of kerfs are configured to be matched with opposite convex kerf portions of an opposite kerf face of each of the plurality of kerfs, convex kerf portions of the one kerf face are configured to be matched with opposite concave kerf portions of the opposite kerf face, and the concave and convex kerf portions that alternate in the lengthwise direction are configured such that protrusion directions of the concave and convex kerf portions are opposite to each other, and
   wherein each of the concave and convex kerf portions comprises:
      a center portion disposed on a center part of the concave or convex kerf portion, the center portion configured to form a tapered curved surface whose lengthwise width gradually decreases from a top of one row of concave kerf portions and convex kerf portions toward a bottom of one row of concave kerf portions and convex kerf portions, and
      side portions disposed in contact with both sides of the center portion, the side portions configured to form a tapered curved surface inclined to the center portion.

2. The pneumatic tire of claim 1, wherein the flange portion is formed in a zigzag shape or a waveform.

3. The pneumatic tire of claim 1, wherein a thickness t1 of a kerf flange portion of each of the plurality of kerfs ranges from 0.1 to 5.0 mm.

4. The pneumatic tire of claim 3, wherein a thickness t2 of an expanded section of each of the plurality of kerfs, which includes convex kerf portions and concave kerf portions, ranges from 1.1 to 15 mm, wherein the thickness t2 of the expanded section is a thickness from an innermost end of a convex kerf portion to an outermost end of a concave kerf portion.

5. The pneumatic tire of claim 4, wherein the thickness t2 of the expanded section of each of the plurality of kerfs is 1.1 to 3 times the thickness t1 of the kerf flange portion of each of the plurality of kerfs.

6. The pneumatic tire of claim 1, wherein each of a length D1 in the lengthwise direction of each of the plurality of kerfs and a width D2 in the depth direction of each of the plurality of kerfs of each one of the concave and convex kerf portions ranges from 1 to 15 mm.

7. The pneumatic tire of claim 1, wherein the flange portion is formed in a waveform and a radius of curvature of the flange portion ranges from 0.5 to 100 mm.

8. The pneumatic tire of claim 1, wherein a radius of curvature R2 of the tapered curved surface of the side portions of the concave and convex kerf portions ranges from 0.5 to 100 mm.

9. The pneumatic tire of claim 1, wherein a depth of the plurality of kerfs is 50 to 90% of a depth of the grooves.

10. The pneumatic tire of claim 1, wherein both of the tapered curved surfaces of the side portions of the concave and convex kerf portions that are in contact with both sides of the center portion of the concave and convex kerf portions have a same radius of curvature or different radii of curvature.

* * * * *